United States Patent Office 3,562,030
Patented Feb. 9, 1971

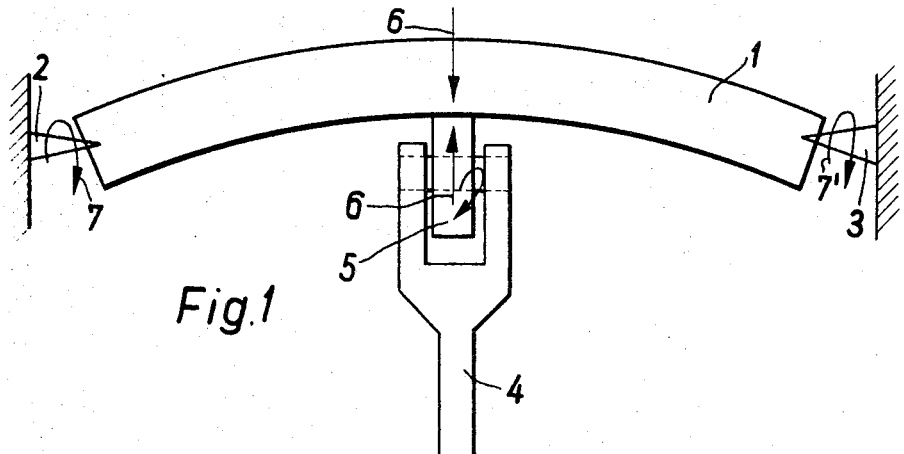
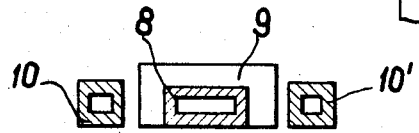
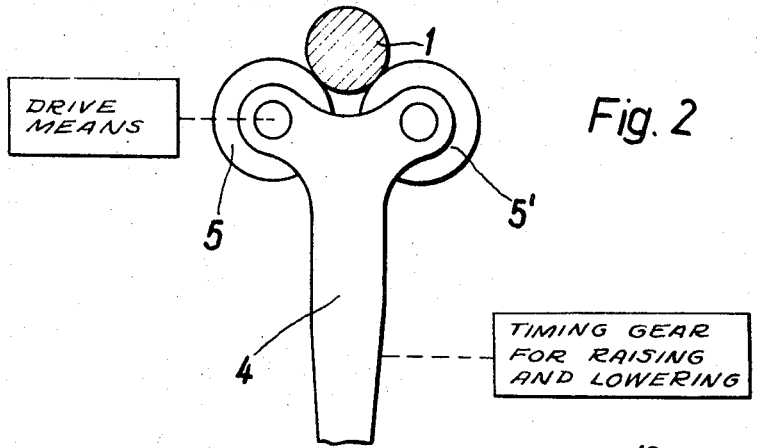
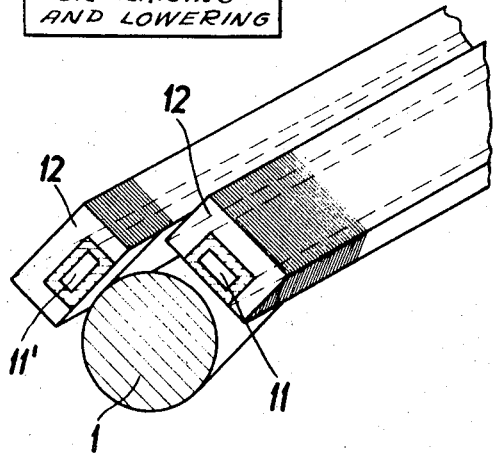

3,562,030
METHOD OF INDUCTIVELY SURFACE HARDENING ELONGATED STEEL WORKPIECES
Gerhard Seulen and Friedhelm Reinke, Remscheid, and Edgar Stengel, Wuppertal-Hahnerberg, Germany, assignors to AEG-Elotherm G.m.b.H., Remscheid-Hasten, Germany
Filed Oct. 20, 1967, Ser. No. 676,806
Claims priority, application Germany, Nov. 18, 1966, A 54,119
Int. Cl. C21d 1/10, 1/42
U.S. Cl. 148—131                                    3 Claims

ABSTRACT OF THE DISCLOSURE

Elongated steel workpieces when inductively heated by rotation in heating position, tend to become distorted. This is avoided according to the invention by supporting said workpiece at a point approximately half-way along its length, and subjecting the said workpiece at this point to a biasing load to produce a deflection at the point of support during the process of heating, and hardening the said heated workpiece.

---

This invention relates to the inductive surface heating of elongated steel workpieces, such as for example axle shafts and bolts.

Workpieces of the said kind may be inductively heated in various ways. One known method of inductive heating is known as the progressive heating method, in which an inductor which is short compared with the length of the workpiece, is moved along the length of the workpiece the workpiece surface being thus heated and then quenched. The inductors used may be in the form of coils embracing the workpiece, or coils forming closed loops on one side of the workpiece which may itself either be stationary or rotate about an axis of symmetry.

Equipment may also be used for heating the workpiece by the overall surface heating technique, in which an elongated inductor is used which forms a closed loop above the workpiece surface and which heats the workpiece to hardening temperature whilst this is being rotated about its axis between centres.

Equipment for the above types of rotary hardening has proved to work satisfactorily for dealing with a variety of hardening problems, provided the length of the workpiece is not excessive and the specification for freedom from distortion and bending of the hardened workpiece is not too high. As will be readily understood elongated workpieces tend to suffer distortion when they are heated and hardened, this tendency being more pronounced the greater the length of the heated and hardened work.

One solution which might suggest itself for overcoming the abovementioned problem, namely the provision of additional support means for the workpieces at least at one point of their length, does not in fact provide the desired results in practice. The present invention provides a solution to this problem, and consists of a method of inductively surface heating and hardening an elongated steel workpiece, comprising rotating said workpiece about its longitudinal axis in the heating position, and supporting said workpiece at a point approximately half-way along its length, and subjecting the said workpiece at this point to a biasing load to produce a deflection at the point of support during the process of heating, and hardening the said heated workpiece. If desired, the said deflection may be produced before the said heating.

It is preferred that the shaft deflection produced by the biasing load according to the invention, should not exceed a value of from 0.02 to 0.5% of its length.

For generating the mechanical biasing load, apparatus according to the invention is provided with an electrically, hydraulically or pneumatically, liftable and lowerable strut, the said strut carrying rollers. At least one of the rollers may be provided with drive means. Timing gear may be provided to control the movement of the strut.

Embodiments of the invention are hereinafter described and illustrated in the accompanying drawings, of which FIG. 1 is a schematic representation illustrating the principle of the invention, FIG. 2 is a cross section of the biasing arrangement of FIG. 1, and FIG. 3 is a perspective schematic view of an alternative inductor arrangement for performing the method according to the invention.

Referring to FIG. 1, a workpiece 1 to be hardened is mounted lengthwise between centres 2 and 3 of which at least one is axially movable and provided with a collet. At least one collet is associated with suitable drive means (not shown), to permit the workpiece to be rotated. Approximately midway along the length of the workpiece, strut 4 having rollers 5 is urged into contact with the workpiece to apply a biasing bending thrust thereto. This mechanical bending thrust causes the centre line of the shaft, before and whilst being heated, to be slightly deflected. This biasing deflection is indicated by arrows 6, and which in the drawing is shown greatly exaggerated. The supporting rollers 5 may themselves be provided with drive means to impart rotation to the workpiece that is to be hardened, for instance in the direction indicated by the arrows 7 and 7'.

The disposition of the supporting rollers 5 and 5' on the end of the strut 4 for deflecting the workpiece is more clearly seen in FIG. 2. For hardening the workpiece good results are achieved by using an inductor which has a hollow and possibly liquid-cooled heating conductor 8 located perpendicularly above the shaft 1 that is to be hardened, and fitted with magnetic yokes 9. The electrical return conductors 10 and 10' extend laterally alongside the heating conductor parallel thereto.

Instead of using an inductor of the kind shown in FIG. 2, the inductor may, as illustrated in FIG. 3, comprise two elongated heating conductors 11 and 11' fitted with magnetic yokes 12 and arranged to form a closed inductor loop above the workpiece. However, when this type of inductor is used the latter must either be lowered towards the workpiece or the workpiece must be lifted into range of the inductor before heating commences.

What is claimed is:

1. A method of inductive surface heating an elongate steel workpiece, comprising rotating said workpiece about its longitudinal axis in the inductive heating position while supporting the said workpiece medially of its length, inductively heating said workpiece, and during the heating process subjecting the said workpiece where it is supported to a biasing load which produces a deflection in the workpiece, and subsequently hardening the heated workpiece.

2. A method as claimed in claim 1, in which the said deflection is produced before the heating step.

3. A method as claimed in claim 1, in which the said deflection produced in the workpiece is between 0.02 to 0.5% of the length of the workpiece.

(References on following page)

References Cited

UNITED STATES PATENTS

| | | | |
|---|---|---|---|
| 2,570,883 | 10/1951 | Stivin | 148—131 |
| 3,124,492 | 3/1964 | Dewez, Jr. et al. | 148—131X |
| 3,169,893 | 2/1965 | Wuerfel | 148—131 |
| 3,202,555 | 8/1965 | Armstrong | 148—131 |
| 3,210,223 | 10/1965 | Good | 148—131 |
| 3,255,053 | 6/1966 | Bard et al. | 148—131 |
| 3,266,956 | 8/1966 | Bennewitz et al. | 148—131 |

FOREIGN PATENTS

| | | | |
|---|---|---|---|
| 1,931 | 1951 | Japan | 148—131 |

CHARLES N. LOVELL, Primary Examiner

U.S. Cl. X.R.

148—150, 154, 155; 219—10.41, 10.57, 10.73